United States Patent [19]
Long et al.

[11] Patent Number: 5,276,786
[45] Date of Patent: Jan. 4, 1994

[54] VIDEO GRAPHICS SYSTEMS SEPARATELY PROCESSING AN AREA OF THE PICTURE BEFORE BLENDING THE PROCESSED AREA INTO THE ORIGINAL PICTURE

[75] Inventors: Robert J. Long, Didcot; Michael T. Mayer, Newbury; John S. O'Neill, Reading, all of England

[73] Assignee: Quantel Limited, Newbury, England

[21] Appl. No.: 908,847

[22] Filed: Jul. 1, 1992

Related U.S. Application Data

[63] Continuation of Ser. No. 402,912, Sep. 5, 1989, abandoned.

[30] Foreign Application Priority Data

Sep. 5, 1988 [GB] United Kingdom ............... 8820862

[51] Int. Cl.$^5$ ............................................. G06F 15/62
[52] U.S. Cl. ..................................... 395/128; 395/139; 358/903
[58] Field of Search ................ 395/135, 139, 155, 161, 395/158, 157, 160, 128; 358/903

[56] References Cited

U.S. PATENT DOCUMENTS

| | | | |
|---|---|---|---|
| 4,514,818 | 4/1985 | Walker | 364/521 |
| 4,546,349 | 10/1985 | Prohofsky et al. | 340/731 |
| 4,602,256 | 7/1986 | Kellar et al. | 358/183 |
| 4,751,507 | 6/1988 | Hama et al. | 340/724 |
| 4,775,858 | 10/1988 | Stapleton et al. | 340/724 |
| 4,809,201 | 2/1989 | Keklak | 364/518 |
| 4,862,155 | 8/1989 | Dalrymple et al. | 340/747 |
| 4,894,646 | 1/1990 | Ryman | 340/747 |
| 4,905,185 | 2/1990 | Sakai | 364/900 |

FOREIGN PATENT DOCUMENTS

| | | | |
|---|---|---|---|
| 0184547 | 6/1986 | European Pat. Off. | G06F 15/64 |
| 2165728 | 4/1986 | United Kingdom | G09G 1/16 |

OTHER PUBLICATIONS

Foley J D, "Fundamentals of Interactive Computer Graphics, " Addison-Wesley, 1982, pp. 41 and 78-87.
Hampton, et al., "Multiprocessor APs Simplify Calculations for Image Processing", Computer Technology Review, Summer 1986, vol. 6, No. 3, pp. 41-45.

*Primary Examiner*—Heather R. Herndon
*Attorney, Agent, or Firm*—Cooper & Dunham

[57] ABSTRACT

A video graphics system in which an effect can be produced in selected portions of a image held in a first store. Image data in the first store relating to a user defined area of interest in the image is copied to a second store and processed in accordance with a user selected function. The area of interest is selected by the user by magnifying and shifting a displayed representation of the image so that the area of interest is displayed and then selecting a locking function which retains parameters associated with the shifting and magnifying of the displayed image. Once the image data relating to the area of interest has been processed it can be painted onto the image held in the first store to produce the desired effect. By processing only the selected area of interest the speed of processing is increased.

21 Claims, 1 Drawing Sheet

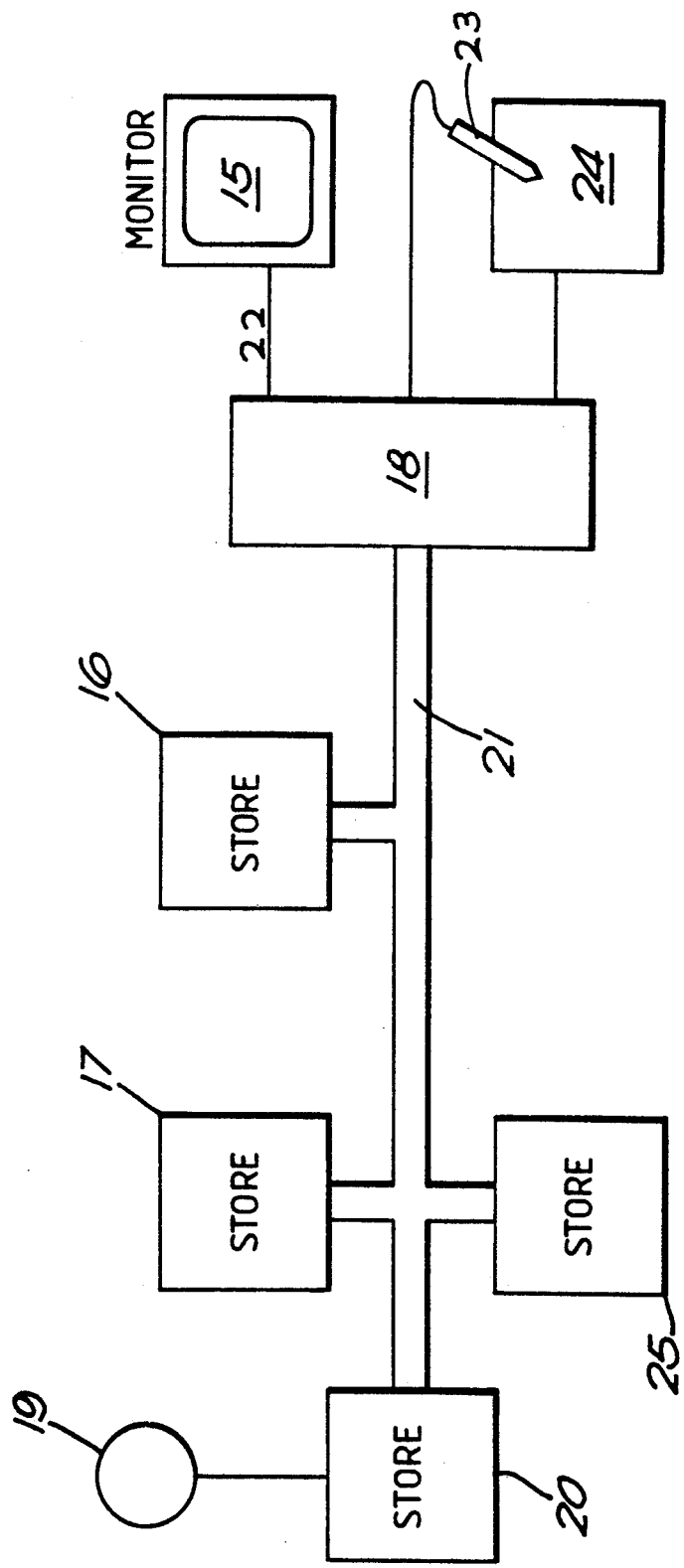

VIDEO GRAPHICS SYSTEMS SEPARATELY PROCESSING AN AREA OF THE PICTURE BEFORE BLENDING THE PROCESSED AREA INTO THE ORIGINAL PICTURE

This is a continuation of application Ser. No. 07/402,912 filed Sep. 5, 1989, now abandoned.

FIELD OF THE INVENTION

The present invention relates to video graphics systems. In particular the invention relates to video graphics systems of the type comprising a processor, operator interface means arranged to instruct said processor, a first image storage device, an image display device arranged to display an image derived from image data stored in said first image storage device, and a second image storage device.

BACKGROUND OF THE INVENTION

An example of a video graphics system of the aforesaid type is described in British Patent No. 2,089,625 and corresponding U.S. Pat. No. 4,514,818 assigned to the present assignee. This system includes a touch tablet and stylus combination for generating position signals designating the position of the stylus relative to the touch tablet. The user paints or draws (hereinafter referred to as "painting") by selecting a desired color and implement from a range of predefined colors and implements and manipulating the stylus on the touch tablet. This manipulation causes the touch tablet to generate a series of position signals which define the path or positioning of the stylus. An image is held in a store and when a position signal is produced a new patch of pixels are derived by a processing circuit for every picture point of the image covered by the selected implement. The image data in the store is read repeatedly and is applied to a TV-type color monitor so that the build up of the picture can be observed. Video graphics systems of this type are manufactured by the present assignee and sold under the trade marks "PAINTBOX" and "GRAPHIC PAINTBOX".

In addition to painting and picture composition as described in the aforesaid patents, systems of this type can also provide for automatic processing of stored images to produce special effects. Some of these effects may be applied to the whole picture, such as a color wash or tint, but others are used much more selectively. Thus parts of an image may be required to be blurred or the reverse process (that is to say a sharpening or crisping of the image) may instead be required and such effects may be achieved by any suitable known blur or crisp algorithm. One known procedure for generating such effects involves an automatic manipulation of data for the whole image, usually involving spatial filtering algorithms or adjustment of color parameters, and results in a manipulated version of the whole of the original image being produced. The final processed data is obtained by processing the manipulated data selectively in combination with the original data by painting selected portions of the manipulated image into the original image, and thus manipulated data is only incorporated into the final image in selected regions. The painting of selected portions can be achieved by deriving pixels by combining the original image pixels with manipulated image pixels and writing the resulting modified pixels back into the framestore as described in British Patent No. 2,113,950 and U.S. Pat. No. 4,602,286 assigned to the present assignee. In this system first and second images are stored in respective first and second storing means and are combined on a picture point by picture point basis by a interpolator under the control of control image data stored in a third storing means. The control image can be created by the operator when the system is in a painting mode as described in the abovementioned British Patent No. 2,089,625 and corresponding U.S. Pat. No. 4,514,818. The control image can be used as a mask or stencil to blank off areas in the first, i.e the original, image to prevent the creation of effects in those blanked off areas of the image. Image data in the blanked off areas of the first image can be prevented from being combined with corresponding image data in the second, i.e modified, image and in this way areas in the first image in which effects are not required can be defined.

The original graphics system of this type operated with a definition suitable for standard (NTSC or PAL) television broadcasting. The abovementioned "GRAPHIC PAINTBOX" is a second generation machine arranged to operate at higher definitions than that of the original system, but recently there has been a demand for machines capable of operating at even higher definitions.

The definition of a picture is increased by increasing the number of picture elements used in defining the picture and increasing the definition of a picture also increases the time taken to copy and manipulate these elements. Thus a machine capable of operating at higher definitions would be correspondingly slower in use than a machine operating at say broadcast definition to such a degree to be irritating to the operator.

OBJECTS AND SUMMARY OF THE INVENTION

An object of the present invention is to mitigate the abovementioned problem and to provide an improved video graphics system in which the number of pixels to be manipulated and transformed in order to achieve desired effects is reduced compared with the prior art system. More particularly it is an object of the present invention to increase the speed at which video graphics systems, and in particular high definition systems, can respond to effects requiring the copying and manipulation of image data.

According to one aspect of the invention, there is provided a video graphics system comprising: a first data store having a plurality of storage locations for storing data defining plural picture points which together represent a picture; an image display device responsive to at least some of said picture point data in said first store for displaying at least a portion of said picture; user operable interface means for defining an area of interest in the picture as displayed by the image display device; and a second data store; and a processor for reading from said first data store picture point data corresponding to the defined area of interest, for processing said read image data to produce processed picture point data, and for writing said processed data to said second data store, said user operable interface means furthermore being arranged to select processed data from said second data store, said processor combining said selected data with respective data from said first data store to produce combined data, said processor thereafter writing said combined data to respective locations of said first data store.

According to another aspect of the invention, there is provided a method of using a video graphics system to produce user selectable effects in selectable portions of a picture held as plural picture points in a first data store having at least one storage location for each picture point stored therein, in which method a representation of a picture displayed on a monitor is shifted and magnified until a desired area of interest of the picture is displayed on the monitor, shift and magnify parameters associated with said desired area of interest being retained to define the area of interest, picture point data in the first data store representing the picture in the defined area of interest is transferred to a second data store having at least one storage location for each picture point stored therein and is processed in accordance with a pre-selected effect, and processed picture point data at selected portions of the picture within the desired area of interest is thereafter combined with respective picture point data in the first data store to produce the desired effect in the picture.

According to yet another aspect of the invention, there is provided a system comprising: a first image store for storing data defining a plurality of picture points representing a first image, a monitor for displaying at least a part of said first image, a processor, and a data bus for transferring data among said first image store, said monitor and said processor; and an operator interface coupled with said processor and responsive to operator input to supply selectively to said processor: (i) area signals designating an area of interest in said first image; (ii) manipulation signals designating a manipulation to be applied to a selected portion of said first image containing some of said plural picture points and corresponding to said area of interest to derive data defining a plurality of picture points representing a manipulated image; and (iii) first blend control signals designating a manner of blending portions of said manipulated image with corresponding portions of said first image to derive a processed image; said processor being responsive to: (i) sad area signals from said operator interface to display on said monitor an image corresponding to aid area of interest in said first image; (ii) said manipulation signals t manipulate said plurality of picture points representing said area of interest in said first image to derive said manipulated image; and (iii) said first blend signals to blend corresponding portions of said first image and said manipulated image in said manner designated by said blend control signals by combining picture point data representing said first image with picture point data representing said manipulated image to derive data defining a plurality of picture points representing said processed first image.

An advantage of the present invention is that the time taken to produce effects requiring automatic manipulation is significantly reduced. This is particularly advantageous when processing high definition images having a matrix of several thousand pixels in both directions.

By arranging for an area of interest to be definable by the user and by arranging the system such that image data associated with the area of interest only is transferred to the second store the amount of data requiring transfer and automatic manipulation, i.e. bulk processing, can be significantly reduced and this will result in a corresponding reduction in the data manipulation time. Furthermore, by arranging for subsequent painting of the modified data only within the area of interest, the possibility of the user inadvertently straying outside the area is eliminated.

A problem with manipulating high definition pictures, having many thousand pixels in each direction, is that manipulation of the image data in the second store is very time consuming and creates a delay which can be irritating to operators. The system embodying the invention, as will be described hereinbelow, therefore includes means by which an area of interest is defined within the displayed image in response to operator instructions. The corresponding area of original data is then copied from the first store to the second store, so that manipulation takes place only within this defined area. Thus by use of this feature the operator can reduce the time taken to manipulate data by selecting a smaller area of interest and then manipulating the data from only that area by way of the processor and this allows for subsequent selective combining of original image data from the first store and manipulated image data from the second store only within the defined area.

Further features of the invention are set forth with particularity in the appended claims and, together with the features abovementioned, will become clear from consideration of the following description of an exemplary embodiment given with reference to the accompanying drawing.

BRIEF DESCRIPTION OF THE DRAWINGS

The single accompanying Figure shows an embodiment of a video graphics system according to the present invention.

DESCRIPTION OF THE EMBODIMENT

A video graphics system is shown in the Figure in which an image is displayed on a video monitor 15 by continuously reading image data from a display refresh store 16. The data in store 16 is derived from a first image data store 17 and data in said first store 17 is processed in response to commands from a processor 18. Image data for a plurality of images are stored on a magnetic disc 19 and supplied to the first image store 17 via a disc buffer store 20. Data transfers between stores 16, 17, 19 and 20 occur over a data bus 21 under the control of the processor 18. A link 22 from the display refresh store 16 to the monitor 15, via processor 18, maintains a steady image on the monitor 15.

An operator interface is provided in the form of a pressure sensitive stylus 23 and a touch tablet 24. In a painting mode data is read from the first image store 17, modified in response to a color selected by the operator and to stylus pressure and then rewritten back to the store 17. Thus in response to operator commands, similar to the actions of a conventional artist using a drafting implement, an artistic image may be created.

In addition to painting, chalking and airbrushing etc, special effects are available which are implemented by automatically processing the image data. To this end a second image store 25 is also provided and is arranged to receive a copy of the original image data from the first store 17. It will of course be appreciated that the first and second stores may simply be different parts of the same store.

In previous systems the processor 18 has been arranged to manipulate the transferred data in store 25 to produce manipulated data by performing operations on the original image data to, for example, crisp or blur the image. The manipulated data in store 25 can subsequently be combined with original data in store 17 in response to operations of the stylus 23 to produce processed data representing a modified image which is written back to the first framestore 17. In this way store 25 would include a copy of all the data in store 17 which has been manipulated so as for example to crisp or blur the whole image. Once the data in store 25 had been manipulated the operator could then operate the stylus, in a similar way to painting, so that selected portions of the data of the original image, i.e. those parts of the image painted over by the user, were combined with the manipulated image data.

Modified data P is derived by combining original data B in store 17 with manipulated data A in store 25 on a pixel-by-pixel basis. The factor k controlling the combination is derived from stylus pressure and notional brush shape or distribution, as described in the above-mentioned British Patent No. 2,113,950 and corresponding U.S. Pat. No. 4,602,286 assigned to the present assignee. Each pixel of the processed data written to the first store 17 is calculated thus:

$$P = kA + (1-k)B;$$

where:
P = modified data;
k = combination controlling factor;
A = manipulated data; and
B = original data.

A distinguishing feature of the system shown in the accompanying drawing as compared to prior art systems is that a selected area of interest of the image may be defined by magnifying and shifting the image by selecting appropriate commands from a menu of commands on the display screen so that the selected image area fills the screen of the display monitor 15 and that a command can then be selected from the menu to "lock" the capabilities of the processor 18 to a magnified area so selected.

When the magnify and shift commands are selected by the user, magnification and shift operations are executed only on the image data portion or area to be displayed as that area is transferred from the first store 17 to the display store 16. Once the desired area is being displayed on the monitor, selection of the lock command causes the processor 18 to retain the parameters associated with the shifting and magnifying of the displayed image. These parameters are used subsequently on transferring the thus selected area of pixel data defining the original image from store 17 to store 25. In addition to the pixel data relating to the defined area of interest, additional pixels defining a guard zone around the boundary of the area may also be transferred to the second store 25 for manipulation in order to facilitate the image modification process by allowing paint brush distributions to be fully defined over the boundary of the area of interest so that modifications can be made to area of interest boundary pixels in the original image when the user paints at the boundary of the area of interest.

The locked area of image data including the guard zone may be manipulated by user selectable functions which for example may apply a color wash or tint to the image area or cause the area to be made sharper or more blurred. Once the selected function has been executed on the image area data in the second store 25, the operator can use the stylus to paint selected portion of the modified image area in the second store 25 onto corresponding portions of the original image in the first store 17. That is to say, the "paint" of the drawing implement is the image data in the second store 25. This painting is done under the control of the operator using the stylus 23 on the touch tablet 24 on a pixel by pixel basis in accordance with the abovementioned combination function $P = kA + (1-k)B$. Thus, pixels from both stores 17,25 can be blended with individual pixels being addressed several times up to the point where saturation is reached, i.e for a given pixel in store 17 the modified image data from store 25 has completely replaced the original data in store 17, as is known for example from the above identified patents. This blending is limited by the shift and magnify parameters retained in the processor 18 to the area of interest in the image. If the operator tries to paint outside this area there will be no effect on the original image.

With a relatively small locked area being defined the time taken for data transfer and manipulation is significantly reduced and this significantly increases the overall operating speed. Selection of manipulated data for processing in store 25 and subsequent painting back to store 17 is restricted to the locked area and the operator must therefore carefully select this area before initiating the operation. However, since operations such as crisping or blurring are often performed only on small magnified areas of the image the process of locking a selected area is well suited to being used as part of the magnifying process.

Having described a specific embodiment of the invention, it is to be appreciated that the invention is not to be regarded as being limited to the described embodiment and that modifications and variations may occur to those possessed of the relevant skills without departure from the spirit and scope of the invention as set forth in the appended claims.

We claim:

1. A video graphics system for processing data defining a multiplicity of picture points forming an initial picture of higher resolution than broadcast television to produce data defining a multiplicity of picture points forming a modified picture containing a manipulated portion of the initial picture, the system comprising:

a first data store for storing data defining multiple picture points which together represent a picture;

an image display device for displaying a picture derived from said picture point data in said first store;

user operable input means for defining an area of interest in the picture displayed by the image display device;

a second data store; and a processor for reading from said first data store picture point data corresponding to the whole of the defined area of interest, for manipulating data representing picture points of said area of interest to produce data defining a manipulated form of said area of interest, and for writing said data defining a manipulated form of said area of interest to said second data store, the processor furthermore being responsive to said user operable input means to select picture point data from said second data store, to combine said selected data with corresponding data from said first data store to produce combined data, and to write said combined data to said first data store to replace the corresponding unmanipulated data previously stored therein, the data in the first store thus representing said modified picture containing a manipulated portion of the initial picture.

2. A video graphics system according to claim 1, wherein the user operable means is operable to enable the user to cause said display device to display a selected portion of the picture represented by the picture point data in the first store and to enable the user to issue a lock command such that the displayed picture portion is defined as the area of interest.

3. A video graphics system according to claim 2, wherein the user operable means is operable to enable the user to cause shifting and magnifying of the picture as displayed by the display device in order to facilitate selection of the portion of the picture for display, the issuing of a lock command causing parameters associated with shifting and magnifying to be retained as parameters operable exclusively for the area of interest.

4. A video graphics system according to claim 1, wherein said user operable means includes a stylus and touch tablet device.

5. A video graphics system according to claim 4, wherein said selected manipulated data from the second store and said respective data from said first data store are combined in accordance with data defining pressure applied by the stylus to the touch table and data defining a notional brush distribution.

6. A video graphics system according to claim 1, wherein the area of interest has an associated guard zone which bounds the area of the interest and said processor is adapted to manipulate data representing picture points in the guard zone and to write guard zone data including said manipulated guard zone data to said second data store.

7. A system as in claim 1, wherein the processor is adapted to write data to said second store before manipulating said data representing picture points of said area of interest.

8. A system as in claim 1, wherein said processor is adapted to manipulate data representing every picture point in said defined area of interest.

9. A method of using a video graphics system to produce user selectable effects in selectable portions of a picture held as plural picture points in a first data store having at least one storage location for each picture point stored therein, in which method a representation of a picture displayed on a monitor is shifted an magnified until a desired area of interest of the picture is displayed on the monitor, shift and magnify parameters associated with said desired area of interest being retained to define the area of interest, picture point data in the first data store representing the picture in the defined area of interest is transferred to a second data store having at least one storage location for each picture point stored therein and is processed in accordance with a pre-selected effect, and processed picture point data at selected portions of the picture within the desired area of interest is thereafter combined with respective picture point data in the first data store to produce the desired effect in the picture.

10. A system comprising:
   a first image store for storing data defining a plurality of picture points representing a first image, a monitor for displaying at least a part of said first image, a processor, and a data bus for transferring data among said first image store, said monitor and said processor; and
   an operator interface coupled with said processor and responsive to operator input to supply selectively to said processor: (i) area signals designating an area of interest in said first image; (ii) manipulation signals designating a manipulation to be applied to a selected portion of said first image containing some of said plural picture points and corresponding to said area of interest to derive data defining a plurality of picture points representing a manipulated image; and (iii) first blend control signals designating a manner of blending portions of said manipulated image with corresponding portions of said first image to derive a processed image;
   said processor being responsive to: (i) said area signals from said operator interface to display on said monitor an image corresponding to said area of interest in said first image; (ii) said manipulation signals to manipulate said plurality of picture points representing said area of interest in said first image to derive said manipulated image; and (iii) said first blend signals to blend corresponding portions of said first image and said manipulated image in said manner designated by said blend control signals by combining picture point data representing said first image with picture point data representing said manipulated image to derive data defining a plurality of picture points representing said processed first image.

11. A system as in claim 10, in which said operator interface includes means responsive to operator input to selectively supply brush selection signals designating a distribution of second blend control signals simulating the distribution of paint by a selected notional painting implement to said processor, and said processor includes means responsive to said brush selection signals to blend corresponding portions of said first image and said manipulated image by combining picture points representing said first image and said manipulated image in a manner which is a function both of said first and said second blend control signals.

12. A system as in claim 11, including a second image store which is coupled with said data bus for transfer of data among the first and second image stores, the processor and the monitor, wherein said plurality of picture points representing said manipulated image is stored in said second store prior to being combined with said picture points representing said selected portion of said first image in order to derive said picture point data representing points of said processed image area of interest;
   in which said processor stores data representing said processed image in said first image store, in place of said data representing said first image; and
   in which said processor causes only said area of interest of said first image to be displayed on said monitor, and said operator interface includes means responsive to change commands from an operator to change selectively the area of interest and to a lock command from the operator to supply said area signals to said processor.

13. A system as in claim 12 in which sad operator interface includes means responsive to operator entries to supply selectively image shifting and image magnification commands to said processor, and said processor includes means responsive to said image shifting and magnification commands to effect corresponding shifting and magnifying changes to said data representing said area of interest in the first image prior to said data being transferred to said monitor for the display of said area of interest thereat.

14. A system as in claim 13 in which said operator interface comprises a table and a stylus for designating positions on the tablet which correspond to positions of picture points in said first image, and wherein said operator interface includes means generating said first blend signals for respective positions in said first image as a function of the pressure of the stylus against the tablet at corresponding positions on the tablet.

15. A system as in claim 10 in which said operator interface comprises a tablet and a stylus capable of designating positions on the tablet and capable of generating, for the respective positions signal, respective pressure signals as a function of the pressure of the stylus against the tablet at the respective tablet positions, wherein said first blend signals are a function of said pressure signals.

16. A method of processing data representing a multiplicity of picture points form in an initial picture of higher resolution than broadcast television to produce data representing a multiplicity of picture points forming a modified picture containing a manipulated picture portion of the initial picture, the method comprising:

storing data defining multiple picture points which together represent the initial picture in a first store;

displaying on a display device a picture derived from the picture point data in the first store;

defining an area of interest in the displayed picture;

reading picture point data from the firs store corresponding to the whole of the defined area of interest;

reading picture point data from the first store corresponding to the whole of the defined area of interest;

manipulating data representing picture points of said area of interest to produce data defining a manipulated form of said area of interest;

storing the data defining said manipulated form of said area of interest in a second store;

selecting picture point data from said second store;

combining the selected data with corresponding unmanipulated data from said first store to produce combined data, and storing said combined data in said first data store in place of the corresponding unmanipulated data previously stored therein, the data in the first store thus representing said modified picture containing a manipulated portion of the initial picture.

17. A method according to claim 16, further comprising displaying a selected portion of the initial picture represented by the picture point data int he first store, said portion being the area of interest of the initial picture.

18. A method according to claim 17, wherein the portion is selected by shifting and magnifying the picture as displayed, and parameters associated with the shifting and magnifying are retained as parameters operable exclusively on the area of interest.

19. A method according to claim 16, wherein the area of interest has an associated guard zone which bands the area of interest, and data for picture points in the guard zone also being manipulated and stored in the second store.

20. A method according to claim 16, wherein data representing every picture point in the defined area of interest is manipulated.

21. A method according to claim 16, wherein said data representing picture points of said area of interest is stored in said second store before said manipulation.

* * * * *